US006163249A

United States Patent [19]

Betcher, III

[11] Patent Number: 6,163,249

[45] Date of Patent: Dec. 19, 2000

[54] ALERT SYSTEM FOR HANDICAPPED INDIVIDUAL

[76] Inventor: Orley O. Betcher, III, 9815 W. 151st St., Orland Park, Ill. 60462

[21] Appl. No.: 08/839,212

[22] Filed: Apr. 22, 1997

[51] Int. Cl.[7] ....... H04B 3/36

[52] U.S. Cl. ....... 340/407.1; 340/332; 340/614; 340/689; 340/573.1; 340/429; 340/539; 200/61.45 R; 200/61.52; 135/65; 135/66; 135/67; 135/68; 379/38

[58] Field of Search ....... 340/407.1, 429, 340/689, 573, 614, 332, 539; 200/61.45 R, 61.52; 180/907; 280/61, 200; 135/65, 67, 68; 379/38

[56] References Cited

U.S. PATENT DOCUMENTS

| | | | |
|---|---|---|---|
| Re. 33,675 | 8/1991 | Young | 180/167 |
| 4,361,408 | 11/1982 | Wirtschafter | 368/10 |
| 5,394,888 | 3/1995 | Stone et al. | 128/782 |
| 5,477,211 | 12/1995 | Reynolds | 340/689 |
| 5,554,975 | 9/1996 | Hall et al. | 340/573 |

*Primary Examiner*—Julie Lieu
*Attorney, Agent, or Firm*—Wood, Phillips, VanSanten, Clark & Mortimer

[57] ABSTRACT

A device for assisting relocation of a handicapped individual, which device has a frame that is disposed between an individual and a surface underlying the individual to assist movement of the individual across the underlying surface. The frame has a first orientation in which the frame resides with the frame being used by the individual to engage the underlying surface and assist movement of the individual across the underlying surface. The device further includes an alarm system for causing a detectable signal to be produced as an incident of the frame being repositioned from the first orientation into a second orientation.

11 Claims, 4 Drawing Sheets

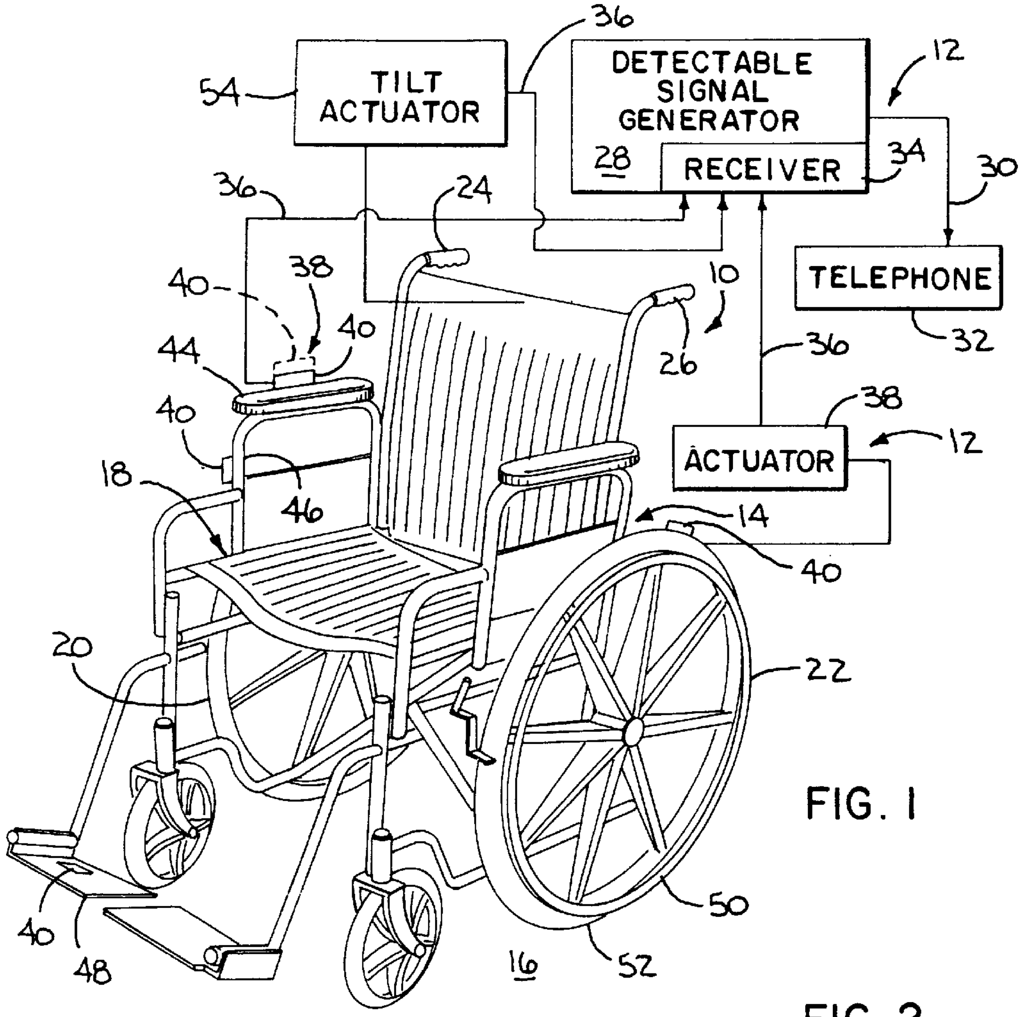
FIG. 1
FIG. 2
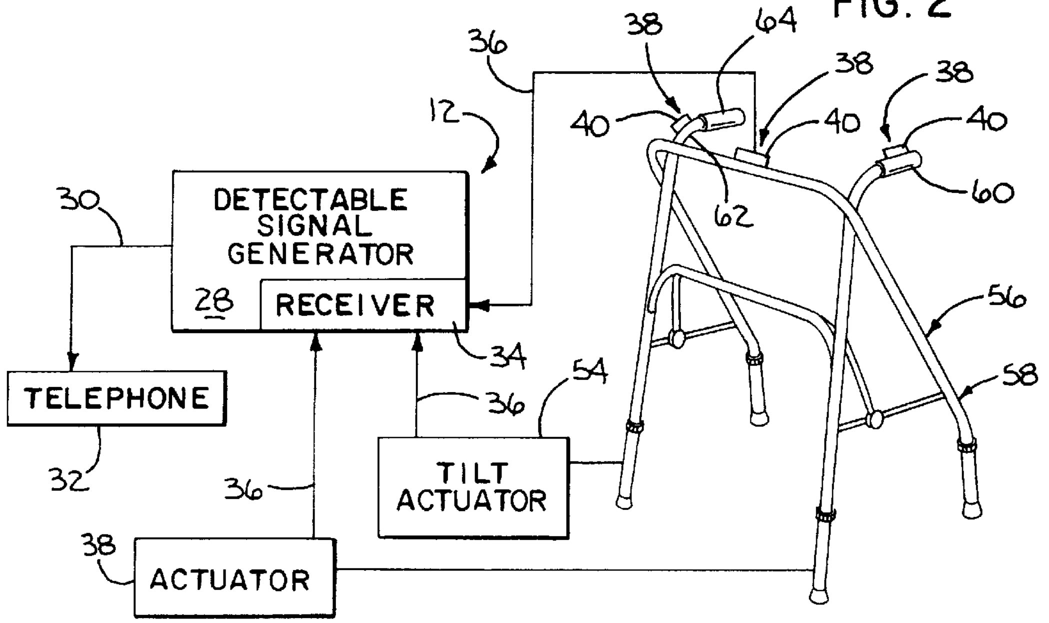

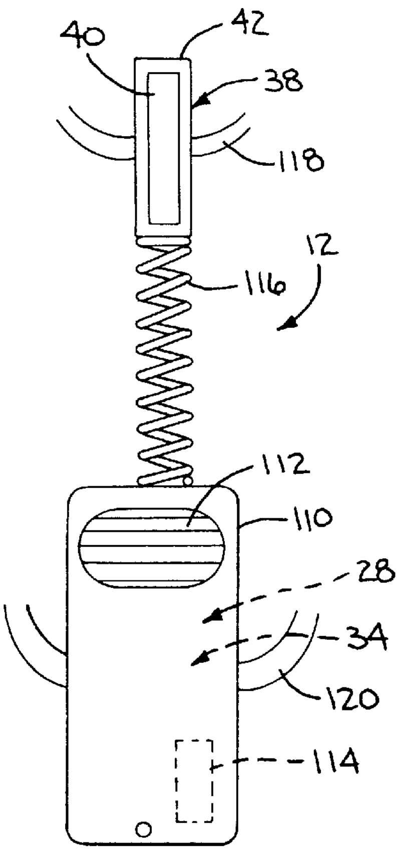
FIG. 8
FIG. 7
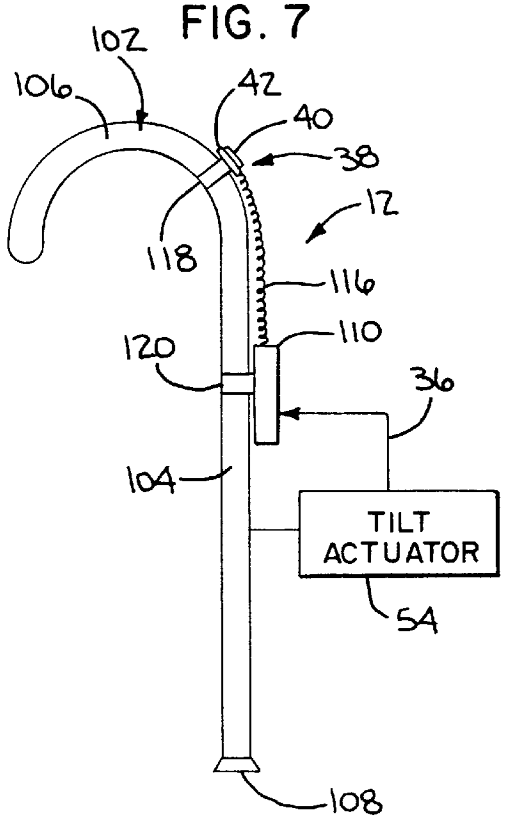
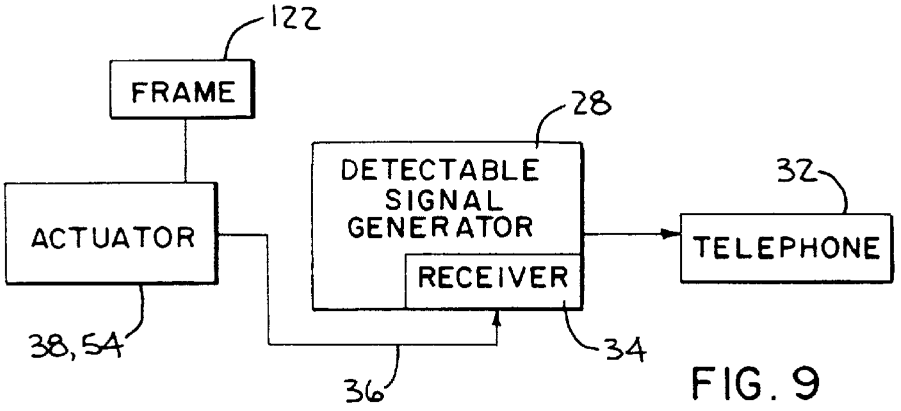
FIG. 9

ALERT SYSTEM FOR HANDICAPPED INDIVIDUAL

BACKGROUND OF THE INVENTION

1. Field of the Invention

This invention relates to systems for aiding handicapped individuals and, more particularly, to a system that facilitates the production of an alert signal by an individual in need of assistance.

2. Background Art

The medical industry is constantly seeking ways to allow handicapped individuals to function independently or with minimal assistance. A large number of handicapped individuals are required to ambulate with the assistance of a walker or a cane. Others are confined to a wheelchair. While many of these individuals are capable of substantially independent living, they are often placed in closely supervised environments principally because of the potential dangers associated with a fall. An otherwise self-sufficient individual might be unable to elevate themselves after a fall. After such a fall, it is not uncommon for some individuals to remain in this state unattended for hours, or days. There are many reported cases of death as a result of individuals falling and being unable to right themselves or summon the necessary help.

To allow a handicapped individual to live relatively independently and safeguard against such situations, an individual in a wheelchair may keep on their person a cellular telephone. However, after such a fall, the person may be totally incapacitated, which makes dialing of the phone impractical. Further, the force of the fall may thrust the telephone out of the reach of the individual.

Systems are also known which allow automatic, remote dialing of an emergency number through a conventional telephone line. In one such system, a transmitter is carried on a chain which may be worn around the user's neck. In the event of a fall, the user need only press a button to access an emergency line. This system also requires that the individual manually convey the signal after the fall occurs. After the fall, the individual may be in an awkward position which prohibits operation of the transmitter. The nature of the person's injury may also be such as to preclude reliable operation of the transmitter.

The need exists for an alert system which is reliable enough to afford peace of mind to a handicapped individual living in a relatively independent environment.

SUMMARY OF THE INVENTION

In one form, a device is provided for assisting relocation of a handicapped individual, which device has a frame that is disposed between an individual and a surface underlying the individual to assist movement of the individual across the underlying surface. The frame has a first orientation in which the frame resides with the frame being used by the individual to engage the underlying surface and assist movement of the individual across the underlying surface. The device further includes an alarm system for causing a detectable signal to be produced as an incident of the frame being repositioned from the first orientation into a second orientation.

As an example, the frame may be one of a walker, a self-propelled unit, a wheelchair, a crutch, and a cane. The frame may have a different angular orientation with the frame in the second orientation than with the frame in the first orientation.

The alarm system may include a tilt switch actuator which causes the signal to be produced as an incident of the frame changing from a first orientation into the second orientation.

The alarm system may include a structure for producing at least one of an audible and a visual signal.

The alarm system may include an actuator for producing an actuating signal to a receiver associated with the structure for producing the signal.

The actuating signal may be an RF signal.

At least one of the audible and visual signal may be at least one of a dialing signal for a telephone, an audible alarm, a light, or the like.

An actuator may be provided that is operable by a user with the frame in the first orientation to cause the alarm system to cause the detectable signal to be produced.

The invention also contemplates a device for assisting relocation of a handicapped individual, which device has a frame that is disposed between an individual and a surface underlying the individual to assist movement of the individual across the underlying surface. The frame has a portion which can be grasped by an individual as the individual uses the frame to assist movement of the individual across the underlying surface. An alarm system is provided for causing a detectable signal to be produced. The alarm system has an actuator on the frame that is operable by an individual using the frame to cause production of the detectable signal.

The actuator may be adjacent to the frame portion.

The actuator may be operable by the hand of a user with the hand grasping the portion of the frame.

In one form, the actuator is in the form of a button that is repositionable between a depressed position and an extended position and the actuator causes the detectable signal to be produced as an incident of the button being moved from one of the depressed and extended positions into the other of the depressed and extended positions.

In one form, the frame is one of a walker and a cane with the frame portion having a graspable handle and the actuator is on the graspable handle.

The alarm system may be battery operated.

The alarm system may include a detectable signal generator that is attached to the frame either permanently or removably.

Similarly, the actuator may be attached to the frame, either permanently or removably.

BRIEF DESCRIPTION OF THE DRAWINGS

FIG. 1 is a perspective view of a conventional wheelchair with an alarm system, according to the present invention, incorporated therein;

FIG. 2 is a perspective view of a conventional walker with an alarm system, according to the present invention, incorporated therein;

FIG. 7 is a side elevation view of a cane with an alarm system, according to the present invention, incorporated therein;

FIG. 8 is an isolated elevation view of one form of alarm system, according to the present invention, as can be used on the various devices in FIGS. 1–7; and FIG. 9 is a schematic representation of a device, as in FIGS. 1–7, incorporating an alarm system, according to the present invention.

DETAILED DESCRIPTION OF THE DRAWINGS

Figure 3:
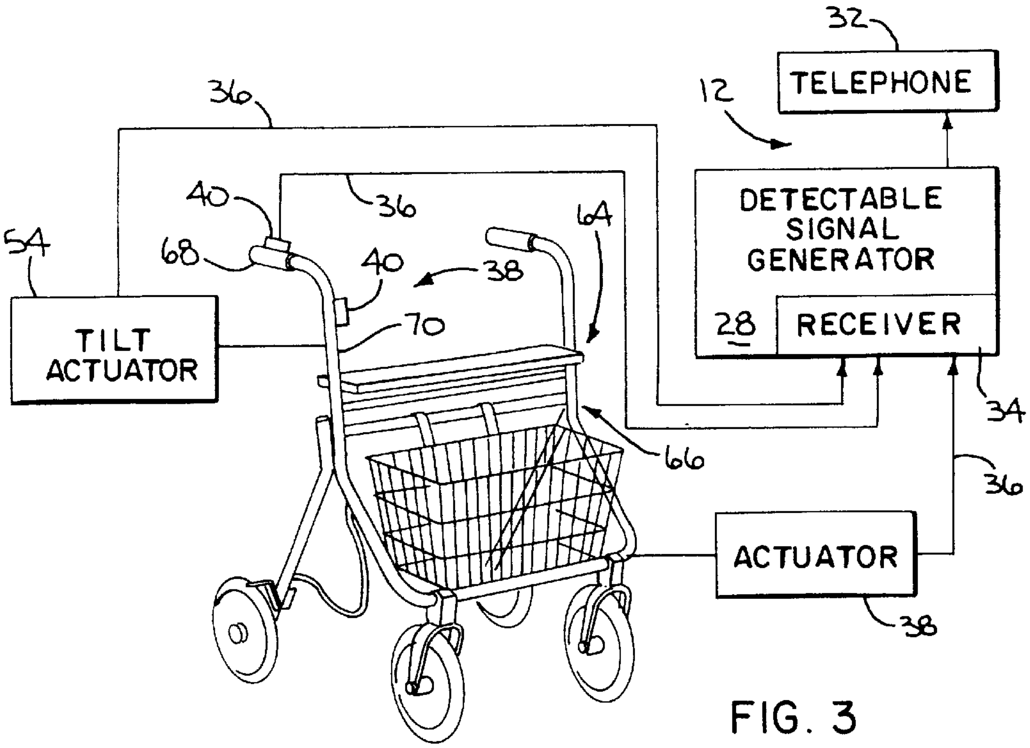
FIG. 3 is perspective view of a modified form of walker with an alarm system, according to the present invention, incorporated therein.

In FIG. 1, a conventional wheelchair is shown at 10 having incorporated therein an alarm system at 12, according to the present invention. The wheelchair 10 is of a conventional construction with a frame 14 disposed between an individual seated thereon and an underlying support surface 16. With a user situated on a seat 18 on the frame 14, the wheels 20, 22 can be grasped and rotated to propel the wheelchair 10. Alternatively, the wheelchair 10 can be advanced by an individual from the rear thereof gripping a pair of handles 24, 26.

According to the invention, the alarm system 12 has a detectable signal generator 28 that is attached to the frame 14 or to the user of the wheelchair 10. The signal generator 28 may be in the form of a buzzer or a horn, to produce an audible signal, or a light that is illuminated to produce a visible signal. Alternatively, the signal generator may produce a dialing signal at 30 as to a telephone 32.

The signal generator 28 has a receiver 34 for an actuating signal 36 from an actuator 38. Exemplary actuator 38 is shown also in FIG. 8 and consists of a compressible button 40 operatively supported on a housing 42. The button 40 could be placed on any part of the frame 14. For example, the button 40 is shown attached to an armrest 44 for movement between an extended position, as shown in dotted lines, and a depressed position, as shown in solid lines. The signal 36 is produced in response to the button 40 moving between the depressed and extended positions.

The system 12 could be set up so that with the user's arm upon the armrest 44, the button 40 is depressed. In the event that the user falls out of the chair the arm separates from the button 40, as an incident of which the button 40 moves to the extended state and thereby produces the signal 36. Alternatively, the button 40 could be situated elsewhere on the frame to be conveniently depressed to produce the signal 36. For example, the button 40 could be placed on a frame arm 46 to be conveniently depressed by the hand on the arm supported on the armrest 44. The button 44 could alternatively be placed on a footrest 48, on the wheel 50, or elsewhere. Other types of switch mechanisms are contemplated by the invention. For example, a switch arrangement could be provided between any relatively movable parts of the frame 14, as by urging the push rim 50 towards the main wheel 52.

With this arrangement, the user of the wheelchair 10 can conveniently operate the actuator 38 when assistance is required. Alternatively, as in the case of having the button 40 on the arm rest, the alert signal 36 will be automatically produced as an incident of the user falling from the chair and thereby releasing his/her arm from the armrest 44.

The invention also contemplates the use of a tilt-type actuator 54 that is attached to the frame 14 to produce the actuating signal 36 as an incident of the frame 14 being repositioned from the upright orientation in FIG. 1 into a second orientation, as a result of the wheelchair angularly repositioning, as by tipping or overturning. Consequently, for persons incapacitated and incapable of reliably operating the actuator 38, the alert signal could be automatically produced as a result of the reorientation of the frame 14. The tilt actuator 54 can be mounted anywhere on the frame. The tilt actuator 54 may have any conventional construction known to those skilled in this art.

The invention is contemplated to be used in virtually every type of device that assists relocation of a handicapped individual. For example, in FIG. 2, the system 12 is shown incorporated into a conventional walker 56 having a frame 58. The alarm system 12 is essentially the same as that described with respect to FIG. 1.

The actuator button 40 could be provided anywhere on the frame 58. For example, the button 40 could be provided on a grip 60 so that it is depressed by the hand of a user grasping the grip 60. Alternatively, the button 40 could be placed on a frame arm 62 below the grip 64 to be conveniently accessed for depression by a hand grasping the grip 64.

In FIG. 3, the alarm system 12 is incorporated into a conventional, wheeled walker 64 having a frame 66. Actuator buttons 40 can be placed anywhere on the frame 66, as upon one of the grips 68 or on an ungrasped part 70 of the frame 66. The tilt switch actuator 54 can likewise be placed anywhere on the frame 66.

Figure 4:
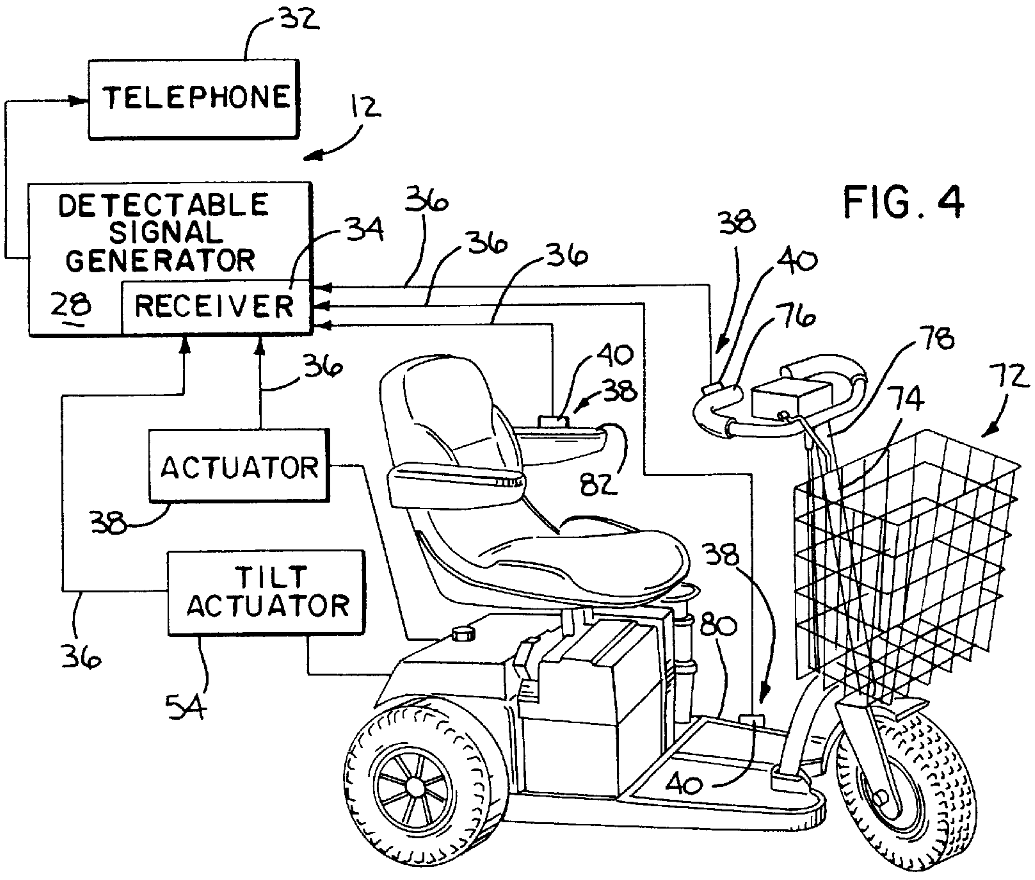
FIG. 4 is a perspective view of a self-propelled unit with an alarm system, according to the present invention, incorporated therein.

In FIG. 4, a self-propelled unit is shown at 72 with a frame 74. An actuator 38 can be provided anywhere on the frame 74. For example, the actuator button 40 can be provided on a grip 76, on a steering column 78, on a foot rest 80, an arm rest 82, or elsewhere on the frame 74. A tilt actuator 54 could be provided anywhere on the frame 74.

Figure 5:
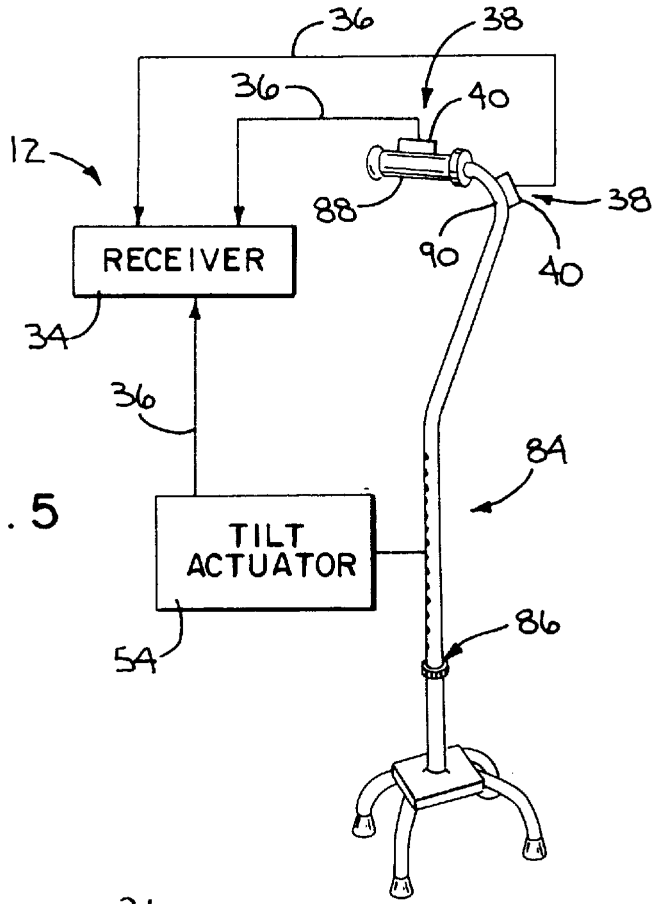
FIG. 5 is a perspective view of cane with an alarm system, according to the present invention, incorporated therein.

In FIG. 5, one form of cane is shown at 84 with a frame 86 to which the inventive alarm system 12 is attached. The actuator button 40 could be provided on a hand holdable grip 88 to be grasped so as to depress the button 40. Alternatively, the button 40 could be provided on an arm 90 projecting from the grip 88 to be readily depressed by a finger on the hand grasping the grip 88. Alternatively, the tilt actuator 54 can be attached to the frame 86. The actuators 38 and 54 have the same construction, as previously described, to generate the signal 36 to the receiver 34.

Figure 6:
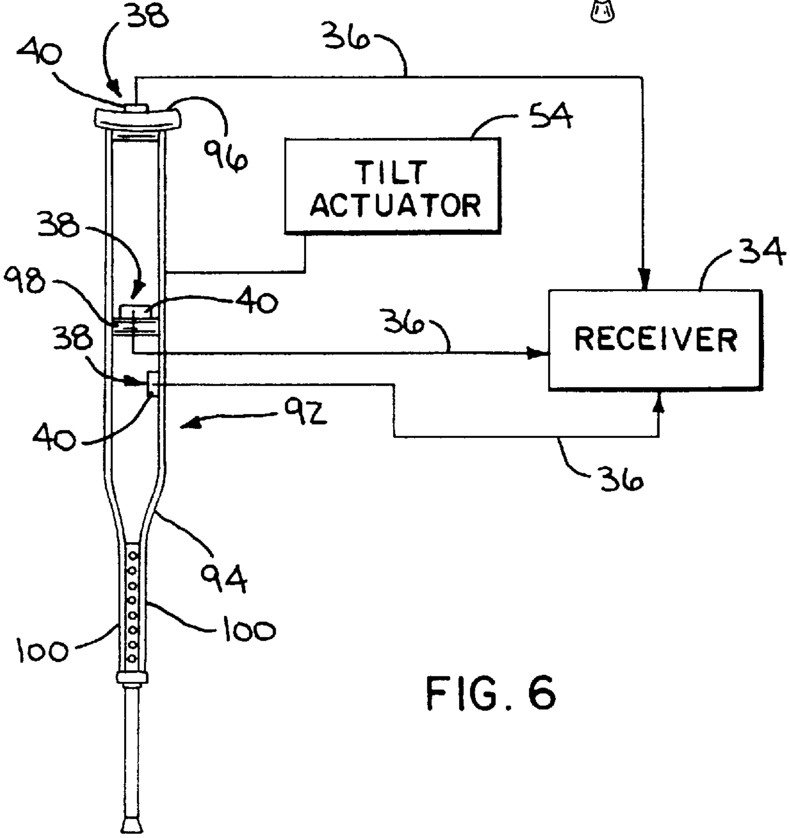
FIG. 6 is a perspective view of a crutch with an alarm system, according to the present invention, incorporated therein.

In FIG. 6, a conventional crutch is shown at 92 with a frame 94. In this case, an actuator button 40 could be provided on a crutch pad 96, a hand grip 98, and/or one of the bows 100. A tilt actuator 54 can likewise be mounted anywhere on the frame 94. The actuators 38 and tilt actuator 54 are operable in the same manner to produce the signal 36 to the receiver 34 as when actuated by the user or upon the frames 94 changing orientation, as in the event of a fall.

In FIGS. 7 and 8, the system 12 is shown attached to a cane 102 having a J-shaped frame 104. The frame 104 has a curved gripping handle 106 to be grasped by the operator and a ground engaging end 108. In this embodiment, the signal generator 28 and receiver 34 are mounted within a housing 110. The signal generator 28 may be a buzzer or horn, as previously described, with the sound projected through a grill 112 on the housing 110. The generator 28 and/or receiver 34 are powered by a battery 114 within the housing 110. The actuating signal 36 is generated by depression of the button 40 which causes the signal 36 to be transmitted through a coiled conductive cord 116 to the receiver 34.

In this particularly embodiment, the housing 42 for the actuator button 40 is releasably maintained upon the frame 104 through the use of a strap 118. A similar strap 120 maintains the housing 110 upon the frame 104 at a lower location. In a preferred form, a Velcro®-type adhesive can be incorporated into the straps 118, 120 to allow the straps to be wrapped around the frame 104 at any desired location thereon, drawn taut, and secured.

In a preferred form, the actuator 38 is located adjacent to the gripping handle 106. With the user grasping the handle 106, the thumb or index finger can be conveniently extended to depress the button 40 to actuate the alarm system 12. So long as the user is grasping the frame 104, the button 40 can be accessed.

The tilt actuator 54, as previously described, can be mounted on the frame 104 to generate the actuating signal 36 to the generator 28. As in all embodiments, the tilt actuator 54 can be provided in conjunction with or as an alternative to the actuator 38. Likewise, the actuator 38 can be used alone, without the tilt actuator 54.

As shown in FIG. 9, the invention contemplates virtually any type of frame that is disposed between an individual and a surface underlying the individual to assist movement of the individual across the underlying surface. In this case, the frame is shown generically at 122. The actuator 38, 54 is attached to the frame and is accessible to the user on the frame to generate the signal 36 to the receiver 34. The signal could be transmitted through a wire conductor or could be transmitted in a wireless system i.e. an RF signal. Upon reception of the signal, the detectable signal generator 28 is operated to produce the detectable signal. The signal may be used to dial a telephone 32 or may itself create a sensory indication of the need for assistance.

The foregoing disclosure of specific embodiments is intended to be illustrative of the broad concepts comprehended by the invention.

What is claimed is:

1. In combination:

a) a device for assisting relocation of a handicapped individual, said device comprising:

a frame that is disposed between an individual and a surface underlying the individual to assist movement of the individual across the underlying surface, said frame having an element which is graspable by an individual using the device in such a manner as to assist movement of the individual across the underlying surface, said frame having a first orientation in which the frame resides with the frame being used by the individual to engage the underlying surface and assist movement of the individual cross the underlying surface; and b) an alarm system for causing a detectable signal to be produced by a user of the device, the alarm system being operable to cause a detectable signal to be produced by at least one of a) manual operation of a manually movable actuator on the alarm system and b) reorienting of a tilt-type actuator, said alarm system being operable to cause the detectable signal to be produced both with the signal generator operably connected to the frame and fully separated from the frame, the alarm system being removably operably connected in a fully operative state to an external surface of the frame, the alarm system in the operable state situated so that one of a) the manually movable actuator can be moved by a hand of an individual using the device and grasping the element and b) the tilt-type actuator is activated as an incident of the frame being repositioned from the first orientation into a second orientation to cause the detectable signal to be produced, whereby the alarm system can be removably retrofit to the external surface of a frame in more than one position without modifying the frame.

2. The combination according to claim 1 wherein the detectable signal is an audible signal.

3. The combination according to claim 1 wherein the manually movable actuator is a button.

4. The combination according to claim 3 wherein the button is operable by a finger on a hand of a user that is grasping the graspable frame element.

5. The combination according to claim 1 wherein the detectable signal is an RF signal.

6. The combination according to claim 1 wherein the detectable signal is a dial signal for a telephone.

7. The combination according to claim 1 wherein the alarm system is battery operated.

8. The combination according to claim 1 wherein the alarm system is removably connected to the frame through the use of a flexible strap.

9. The combination according to claim 8 wherein the flexible strap has a Velcro®-type adhesive thereon that allows the flexible strap to be wrapped against itself to define a restrictable loop extending around a part of the frame.

10. The combination according to claim 1 wherein the frame comprises one of a walker, a self-propelled unit, a wheelchair, a crutch, and a cane.

11. The combination according to claim 1 wherein the detectable signal is a visual signal.

* * * * *